Figure 1:
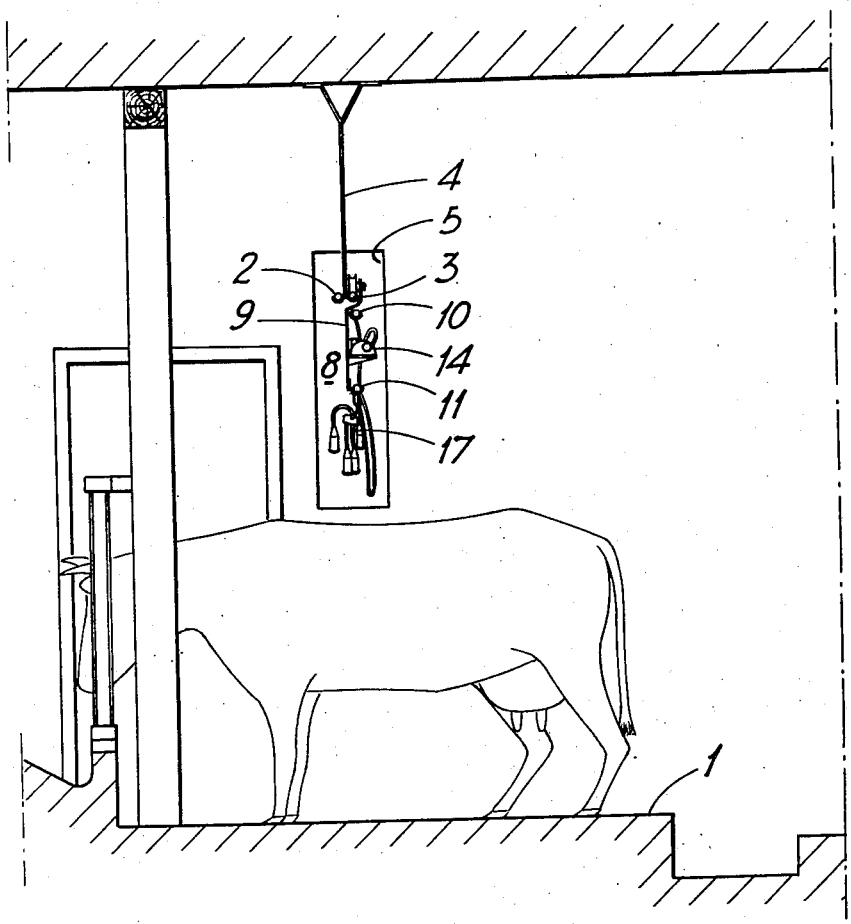

May 10, 1949.　　　E. G. REDIN ET AL　　　2,469,519
MACHINE MILKING PLANT

Filed March 5, 1948　　　　　　　　　　　4 Sheets-Sheet 1

Inventors:
Eric Georg Redin
Karl Erik Olander
by W. Bayard Jones
Attorney

Inventors:
Eric Georg Redin
Karl Erik Olander

Patented May 10, 1949

2,469,519

UNITED STATES PATENT OFFICE 2,469,519

MACHINE MILKING PLANT

Eric Georg Redin and Karl Erik Olander, Norrkoping, Sweden, assignors to Aktiebolaget Manus, Norrkoping, Sweden, a company of Sweden Application March 5, 1948, Serial No. 13,177
In Sweden March 10, 1947

6 Claims. (Cl. 31—58)

When milking cows by the use of ordinary pail-type milking machines it is necessary to move the milking machine from one cow to another, and since, at least in the case of medium-sized and large stocks, the vacuum required for operation of the machine is obtained from a stationary vacuum pipe or conduit mounted along the row of stalls for the cows, in which conduit vacuum is generated by a vacuum pump which is usually mounted in a milk chamber or machine room outside the cow house or barn, it is necessary for each removal of the milking machine first to disconnect the vacuum tube of the machine from the stationary vacuum conduit and then again to connect the said tube to the vacuum conduit at the next place of use of the machine, all of which involves much work and a considerable expenditure of time. The pail or receptacle forming a part of a milking machine of the ordinary type and in which the milk is collected, must either be exchanged for a fresh pail for each or every second cow, or the milk must be emptied from the pail into an auxiliary bucket, and when said bucket has become filled, the milk is transported in said bucket from the cow barn to the milk chamber. In addition to the time required for the milking itself, and the time required for disconnecting the milking machine from the vacuum conduit and again connecting it to said conduit at the next place of use, a considerable amount of time is also spent in exchanging the pails or for pouring the milk into an extra bucket and for transporting said bucket to the milk chamber, and much time is also consumed in washing the milk pails and the extra bucket. A further disadvantage is that the air in the cow barn comes in contact with the milk when exchanging pails or when the milk is poured into the extra bucket and when transporting the milk out from the cow barn.

The present invention relates to a machine milking plant in which all of the above mentioned difficulties and inconveniences are avoided, and through which certain important advantages are attained.

In the machine milking plant according to the present invention there is provided, in a manner known per se, in the cow house along the row or rows of stalls for the cows a track rail on which a carriage is movable and displaceable, as well as a stationary milk conduit and a stationary vacuum conduit which extend from the row or rows of stalls, either both to a milk chamber, or more usually, in accordance to the present practice, the milk conduit extends to a milk chamber and the vacuum conduit to a machine room. The essential characterizing feature of the present invention is that the carriage is provided with a plurality of teat cup units commensurate to simultaneous milking of a predetermined number of cows while the carriage occupies one of its working positions, the teat cup units being positioned on said carriage at the appropriate distances from one another for such simultaneous milking of a predetermined number of cows; there being also provided on said carriage a substantially horizontal milk conduit or pipe which is common to the aforesaid teat cup units and to which the milk tubes of said teat cup units are connected; said milk conduit being provided at one end, at least, with a connecting device for connecting the said conduit on said carriage to the stationary milk conduit, there being further provided on said carriage a substantially horizontal vacuum conduit or pipe common to the teat cup units and to which the vacuum tubes of said teat cup units are connected, said vacuum conduit on said carriage being provided at one end, at least, with a connecting device for connecting it to the stationary vacuum conduit.

Owing to a plurality of teat cup units being provided on a movable carriage, according to the present invention, the work required for moving the teat cup units is considerably facilitated, as is also the connection and disconnection of the teat cup units, since according to the invention all teat cup units provided on the carriage are simultaneously connected to and disconnected from the stationary conduits, whereby a great saving in time and labor is attained. The milking is performed while the cows are tethered to their respective stalls. Accordingly, it is not necessary, as in releaser plants as heretofore used, to lead the cows to a special milking place, and in this manner further economy of labor and time is attained.

The invention also provides the very important advantage of making it possible, in a manner to be further explained here below, to use a comparatively short stationary milk conduit, whereby the initial cost of the plant is reduced, and the labor and time required for cleaning the stationary milk conduit after each milking operation is considerably reduced.

Particularly when the local conditions, for instance in connection with the installation of a machine milking plant in an old cow barn, necessitate the use of a comparatively long stationary vacuum conduit, the movable carriage is provided, according to the invention, with at least one pulsator connected between the vacuum conduit on the carriage and the vacuum tubes of the teat cup units, said pulsator serving to produce a pulsating vacuum in the teat cups from a uniform vacuum in the stationary vacuum conduit. Preferably, however, the carriage is provided with a plurality of pulsators corresponding to the number of teat cup units on the carriage, each such pulsator being connected between the vacuum conduit on the carriage and its corresponding teat cup unit. In both these cases the advantage is attained that the plant can be operated with a uniform vacuum in the stationary vacuum conduit, which renders it possible to maintain in said last mentioned conduit a sufficiently strong vacuum for producing, by means of the pulsator or pulsators on the carriage, sufficiently strong pulsations in the teat cup units for performing the milking operation, irrespective of at what place in the cow barn the carriage happens to be positioned.

Figure 2:
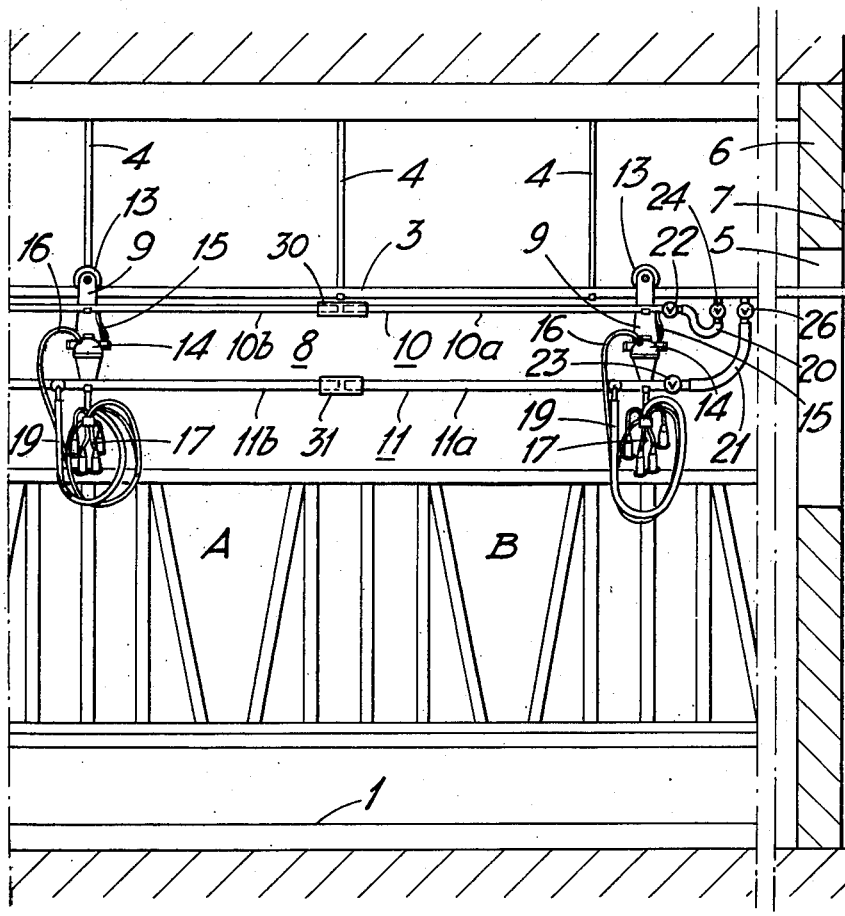
Figure 3:
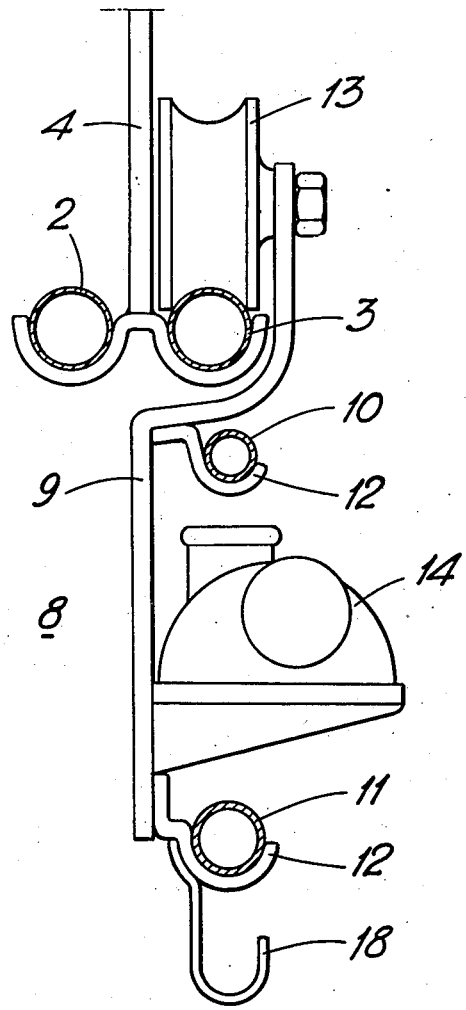
Figure 4:
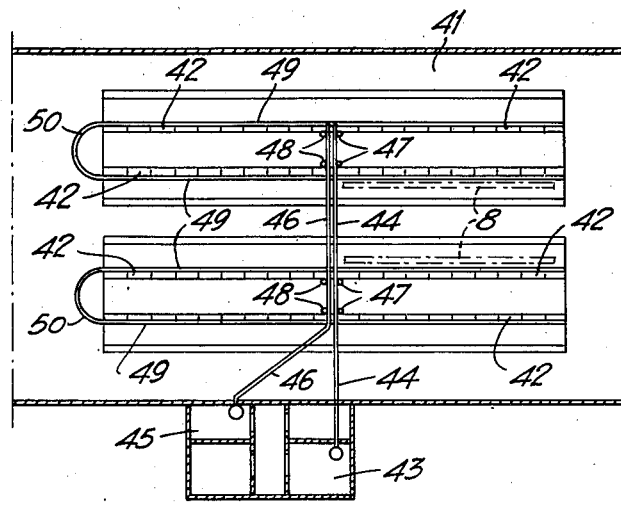
Figure 5:
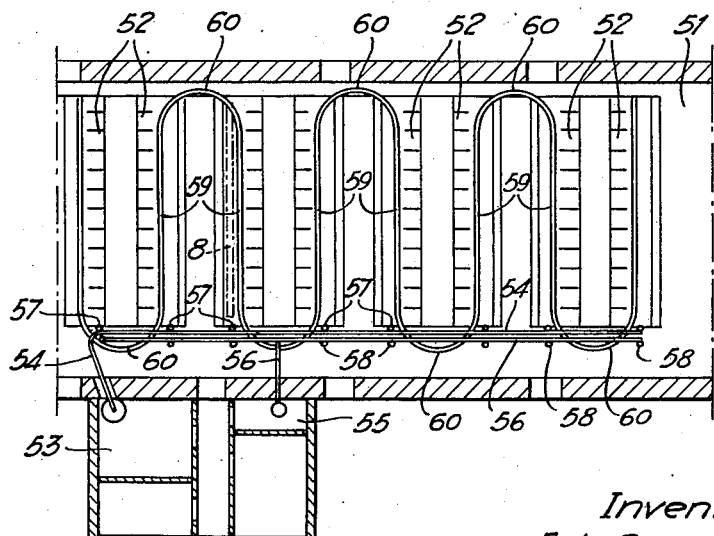

The accompanying drawings illustrate by way of example a few constructional forms of machine milking plants according to the invention. Fig. 1 shows schematically a cross section of a portion of a cow barn viewed in the direction of the row of stalls, and Fig. 2 shows a fractional longitudinal section of the cow barn and a fractional side view of the movable carriage, while Fig. 3 shows to a larger scale an end view of the movable carriage. Figs. 4 and 5 are schematic plan views which illustrate various arrangements of the plant in the cow barn.

As illustrated in Figs. 1 and 2 of the drawings, there extend over the row of stalls which is represented in the drawings by the so-called stall platform 1, two pipe conduits, viz, a stationary milk conduit 2 and a stationary vacuum conduit 3 which are supported from the ceiling of the cow barn by means of supporting straps 4. The pipe conduits 2 and 3 extend through an opening 5 in the wall 6 of the barn into the milk chamber, which is indicated at 7 in Fig. 2, the pipe conduits being connected in said milk chamber in the ordinary manner to a vacuum pump, not illustrated in the drawing, which serves to maintain the required vacuum in said conduits, and in addition, the milk conduit 2 is connected to a releaser, not illustrated in the drawing, for automatic discharge of the milk from said conduit.

In the construction illustrated in Figs. 1 to 3 inclusive, the stationary vacuum conduit 3 serves as a track rail for a carriage generally designated 8. As illustrated in the drawing, the said carriage comprises a number of hangers 9 which support two pipes 10 and 11, as by means of hooks or holders 12, which are attached to the hangers 9. Rotatably attached to the upper end of each hanger 9 is a runner wheel 13, said wheel running on the stationary pipe conduit 3 so that in this manner the carriage as a whole is movable on said conduit 3. In the construction illustrated, there is mounted on each hanger 9 a pulsator 14 which is connected by means of an elastic tube 15, Fig. 2, with the upper pipe 10 of the carriage. Elastic tubes 16, Fig. 2, lead from each pulsator 14 to the distributor or central of a teat cup unit 17 of a type well known per se, which is shown in Figs. 1 and 2 as hanging from a hook 18, Fig. 3, which is attached to the hanger 9. A milk tube 19 leads from the distributor of the teat cup unit to the lower pipe 11 of the carriage. The upper pipe 10 of the carriage is provided at its end with a stopcock 22 and beyond the latter with a connecting device, which is illustrated in Fig. 2 as consisting of an elastic tube 20, by means of which said pipe 10 may be connected to the stationary vacuum conduit 3 at different connecting points on the latter, which points are represented in Fig. 2 by a stopcock 24 attached to said conduit 3 and provided with a nozzle to which the tube 20 is connected. In a like manner the lower milk pipe 11 of the carriage is provided at its end with a stopcock 23 and beyond the latter with a connecting device, also illustrated as consisting of an elastic tube 21, by means of which the pipe 11 may be connected to the stationary milk conduit 2 at different connecting points on the latter, which are represented in Fig. 2 by a stopcock 26 attached to the conduit 2 and having a nozzle for connection to the tube 21. Preferably, the pipes 10 and 11 are provided with similar stopcocks 22 and 23 and connecting devices 20 and 21, respectively, also at their opposite ends, which are not illustrated in Fig. 2. This arrangement renders it possible to connect the two pipes 10 and 11 on the carriage to the stationary conduits 3 and 2 at that end of the carriage which, in the various operating positions of said carriage, happens to be nearest to connecting points 24 and 26, respectively, on the two stationary conduits. Accordingly, the pipe 10 may be deemed to constitute a portion of the vacuum conduit movable with the carriage 8, while the pipe 11 constitutes a portion of the milk conduit movable with the carriage.

The teat cup units 17 are suitably placed on the carriage 8 at such distances from one another that when the carriage 8 is connected to the conduits 2 and 3 in a certain position of use, there will be two cows between every two adjacent teat cup units, as is indicated by the stalls A and B in Fig. 2. In such position of the carriage it is thus possible with each teat cup unit to milk one cow on either side of the point where the teat cup unit is suspended from the carriage. Consequently, assuming that the carriage is provided with three teat cup units, it is possible in each position of the carriage to milk six cows, after which the connections 20 and 21 are disconnected and the carriage is moved to the next group of six cows, and while the cows of this group are being milked with the teat cup units, the first group of cows may be after-milked by hand, if necessary. The number of teat cup units on the carriage may, of course, be varied to suit different requirements.

When the track rail, which in the constructional form illustrated in Figs. 1 and 2 consists of the vacuum conduit 3, is straight so that the carriage 8 has a rectilinear path of movement without bends or curves, the pipes 10 and 11 may, of course, consist of straight rigid pipes extending across the entire width of the carriage 8. On the other hand, when the track rail for the carriage comprises bends or curves, it is advantageous to make the carriage 8 of several parts hinged or articulated relatively to one another about vertical axes. Such an arrangement may be accomplished in a simple manner by each of the two conduits 10 and 11 on the carriage 8 being made up of separate pipe lengths 10a, 10b, and 11a, 11b, respectively, which are jointed to one another at points located substantially midway between two adjacent hangers 10, by means of short pieces of elastic tubes 30 and 31, respectively, made for instance of rubber. In this way the tube pieces 30 and 31 form articulated joints or hinges in the carriage 8. By providing similar joints or hinges in the conduits 10 and 11 at points located approximately midway between every pair of hangers 9, the carriage will become sufficiently articulate to run easily along curves or bends in the track rail.

In the plant according to the invention illustrated in Figs. 1 to 3 inclusive of the drawings, the milk will, of course, flow from the teat cups to and through the pipe 11 to the stationary milk conduit 2 and from the latter to the milk chamber, and consequently, the milk will not come in contact with the air in the cow barn. Since the carriage is provided with pulsators which are directly connected to the teat cup units, the difficulty of maintaining a pulsating vacuum in the stationary vacuum conduit 3 is eliminated, and a uniform vacuum may be maintained in the said conduit, while the pulsators 14 on the carriage 8 which are connected to the vacuum conduit 3 in the manner above described, ensure the pulsating vacuum required for the teat cup units. With the use of the novel plant according to this invention it is possible, therefore, to effect the milking also in very large cow barns in which the row of stalls extend relatively far from the milk chamber and from the vacuum pump in said chamber, and it is thus possible to milk all cows also in a large cow barn, while the cows remain tethered to their regular stalls.

Fig. 4 illustrates schematically and in plan view an arrangement of a machine milking plant according to this invention in a cow barn. In the instance illustrated in Fig. 4, there are four rows of stalls in the cow barn 41, each row comprising twenty stalls 42. From a milk chamber 43 a stationary milk conduit 44 extends into the barn, and a stationary vacuum conduit 46 extends from the machine room 45 into the barn. In the barn the said two conduits 44 and 46 extend in a direction transverse to the rows of stalls over the middle point of said rows, so that in the instance illustrated, there are ten stalls of each row on either side of the conduits 44 and 46. The conduit 44 is provided with connecting means at the points 47, and the conduit 46 is provided with connecting means at the points 48. Each of the track rails 49 extends along one row of stalls and then in a semi-circle 50 to the opposite row of stalls. The carriages 8 which are movable along the track rails, and which are represented in Fig. 4 by dot and dash rectangles, and which are assumed to be articulated in the manner above described, may thus be moved along one row of stalls and then over the semi-circular portion 50 of each track rail to the opposite row of stalls. In the instance illustrated, where the rows of stalls are divided into groups comprising ten stalls, the carriages may suitably be provided with five teat cup units, so that five of the cows at each group of stalls may be milked first and afterwards the remaining five cows, while the carriage remains stationary at one working position and the milk and vacuum pipes of the carriage are connected to the two stationary conduits at a pair of connecting points 47 and 48. When the milking of a group of cows which in this instance is assumed to comprise ten cows, is finished, the carriage is disconnected from the stationary conduits 44 and 46 and is moved to the next group of stalls where it is again connected to the stationary conduits. It will be readily understood from the foregoing description that it is advantageous to provide the carriage with connecting devices at both ends of the carriage, to facilitate connection of the carriage to the stationary conduits in any position of the carriage. It will also be readily understood from the above description in conjunction with the drawing that the use of a carriage 8 provided with a large number of teat cup units, coupled with a suitable arrangement of the various groups of stalls, provides the advantage that the milk conduit 44 becomes comparatively short, and that a relatively small number of connecting means 47 will be required on said conduit, so that the conduit will be easily cleaned. Also the vacuum conduit 46 will have a correspondingly short length, whereby a reduction of the initial cost of the plant is gained.

Similar advantages as those above explained are attained also with the arrangement of a machine milking plant according to the invention as schematically illustrated in plan view in Fig. 5. As shown in this figure, the cow barn 51 is provided with eight rows of stalls, each row comprising twelve stalls 52. In this case the rows of stalls extend in a transverse direction of the barn. The stationary milk conduit 54 extends from the milk chamber 53 in the longitudinal direction of the barn at the ends of the rows of stalls and is shown as provided with a connecting means 57 at each row of stalls. The stationary vacuum conduit 56 from the machine room 55 also extends in the longitudinal direction of the barn at the ends of the rows of stalls and is provided with connecting means 58. The track rails 59 which extend along the rows of stalls are connected with one another through semi-circular portions 60 at the ends of the rows of stalls. The movable carriage 8, which is represented in Fig. 5 by a dot and dash rectangle, and which is assumed to be articulated in the manner above described, may thus be run along the track rail to any of the eight rows of stalls. In this instance, when each group comprises twelve stalls, the carriage may suitably be provided with six teat cup units, so that while the carriage occupies a working position along a group of stalls, the cows at this group of stalls may be milked in two operations, each comprising six cows. The milking being finished, the carriage is disconnected from the connecting means at this working position of the carriage, which is then run to the next row of stalls and is there connected to the stationary conduits, but in this case such connection is effected by means of the connecting devices at the opposite end of the carriage. It will be readily seen that also with the arrangement of the rows of stalls and of the stationary conduits as shown in Fig. 5, a substantial reduction of the length of said stationary conduits is attained, as are also the advantages accruing therefrom as above explained.

It will be understood that the invention is not limited to the constructional forms above described and illustrated in the drawings, and that various modifications may be made therein within the scope of the following claims.

As above explained, the stationary vacuum conduit may extend from the barn to the milk chamber, in which the vacuum pump may be positioned, and in such case the milk chamber serves simultaneously as a machine room. For this reason, the terms "milk chamber" and "machine room" in the accompanying claims should be interpreted as covering also a single room serving both as a milk chamber and as a machine room.

We claim:

1. A machine milking plant for a cow barn having a stationary milk conduit extending from a milk chamber into said barn, and a stationary vacuum conduit extending from a machine room into said barn, comprising a track rail extending along one row of stalls at least in said barn, a carriage structure movably mounted upon said truck rail, a plurality of teat cup units on said carriage structure, the number of said units being commensurate to and said units being spaced at appropriate distances from one another for simultaneous milking of a predetermined number of cows while the carriage structure occupies a predetermined working position, a substantially horizontal milk conduit on said carriage structure common to said teat cup units, said teat cup units having milk tubes connected to said milk conduit on said carriage structure, a connecting device at one end at least of said milk conduit on said carriage structure for connecting said milk conduit to said stationary milk conduit, a substantially horizontal vacuum conduit on said carriage structure common to said teat cup units, said teat cup units having vacuum tubes connected to said vacuum conduit on said carriage structure, and a connecting device at one end at least of said vacuum conduit on said carriage structure for connecting said vacuum conduit to said stationary vacuum conduit.

2. A machine milking plant as defined in claim 1, further comprising at least one pulsator on said carriage structure connected between the vacuum conduit on said carriage structure and the vacuum tubes of said teat cup units, said pulsator being adapted to produce a pulsating vacuum in the teat cups of said teat cup units from a uniform vacuum in the stationary vacuum conduit.

3. A machine milking plant as defined in claim 1, further comprising a plurality of pulsators on said carriage structure, the number of such pulsators equalling the number of teat cup units, each pulsator being connected between the vacuum conduit on said carriage structure and the vacuum tube of one of said cup units.

4. A machine milking plant as defined in claim 1, further comprising a shut-off valve at each end of said milk conduit on said carriage structure, a connecting device at each end of said milk conduit on said carriage structure for connecting said conduit to said stationary milk conduit, a shut-off valve at each end of said vacuum conduit on said carriage structure, and a connecting device at each end of said vacuum conduit on said carriage structure for connecting said conduit to said stationary vacuum conduit.

5. A machine milking plant for a cow barn having a stationary milk conduit extending from a milk chamber into said barn, and a stationary vacuum conduit extending from a machine room into said barn, comprising a track rail extending along one row of stalls at least in said barn, a carriage structure movably mounted upon said track rail, a plurality of teat cup units on said carriage structure, the number of said units being commensurate to and said units being spaced at appropriate distances from one another for simultaneous milking of a predetermined number of cows while the carriage structure occupies a predetermined working position, a substantially horizontal milk conduit on said carriage structure common to said teat cup units, said milk conduit on said carriage structure comprising a plurality of pipe lengths, elastic tubes connecting adjacent ends of said pipe lengths at point located substantially midway between two adjacent teat cup units on said carriage structure, said teat cup units having milk tubes connected to said milk conduit on said carriage structure, a connecting device at one end at least of said milk conduit on said carriage structure for connecting said milk conduit to said stationary milk conduit, a substantially horizontal vacuum conduit on said carriage structure common to said teat cup units, said vacuum conduit on said carriage structure comprising a plurality of pipe lengths, elastic tubes connecting adjacent ends of said pipe lengths at points located substantially midway between two adjacent teat cup units on said carriage structure, said teat cup units having vacuum tubes connected to said vacuum conduit on said carriage structure, and a connecting device at one end at least of said vacuum conduit on said carriage structure for connecting said vacuum conduit to said stationary vacuum conduit.

6. A machine milking plant for a cow barn having a stationary milk conduit extending from a milk chamber into said barn, and a stationary vacuum conduit extending from a machine room into said barn, the stalls for the cows in said barn being arranged in groups each comprising a predetermined number of stalls, at least one track rail extending along said groups of stalls, a carriage structure movably mounted upon said track rail, a plurality of teat cup units on said carriage structure, the number of said units being commensurate to simultaneous milking of a number of cows equal to half the number of stalls of each group of stalls with the carriage structure occupying a working position at such group of stalls, a substantially horizontal milk conduit on said carriage structure common to said teat cup units, said teat cup units having milk tubes connected to said milk conduit on said carriage structure, a shut-off valve at each end of said milk conduit on said carriage structure, a connecting device at each end of said milk conduit on said carriage structure for connecting said milk conduit to said stationary milk conduit, a substantially horizontal vacuum conduit on said carriage structure common to said teat cup units, said teat cup units having vacuum tubes connected to said vacuum conduit on said carriage structure, a shut-off valve at each end of said vacuum conduit on said carriage structure, a connecting device at each end of said vacuum conduit on said carriage structure for connecting said vacuum conduit to said stationary vacuum conduit, connecting means on said stationary milk conduit at each group of stalls for connecting one of said connecting devices for the milk conduit on said carriage structure to said stationary milk conduit, connecting means on said stationary vacuum conduit at each group of stalls for connecting one of said connecting devices for the vacuum conduit on said carriage structure to said stationary vacuum conduit.

ERIC GEORG REDIN.
KARL ERIK OLANDER.

No references cited.